Nov. 5, 1929.  W. J. MILLER  1,734,821
SALT AND PEPPER DISPENSER
Filed July 26, 1928
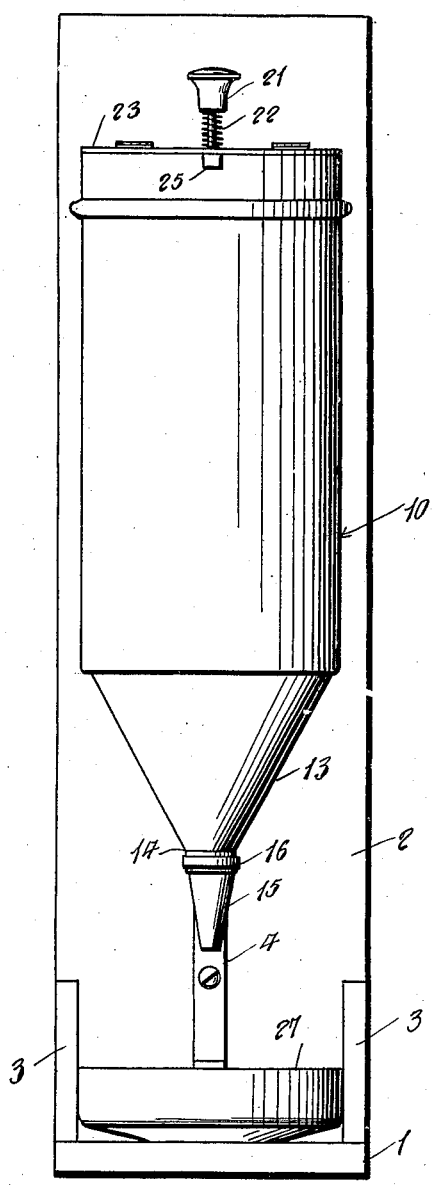
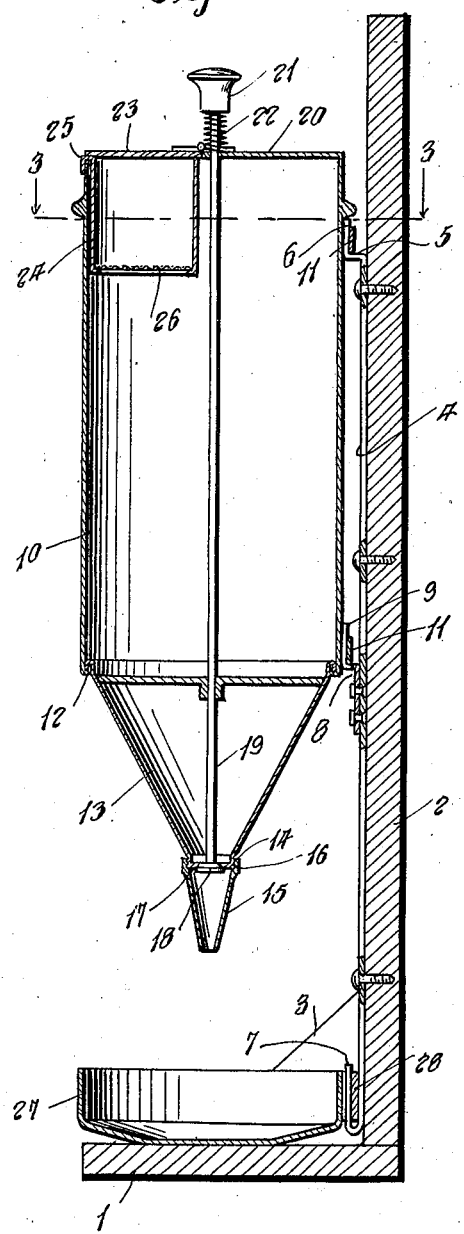
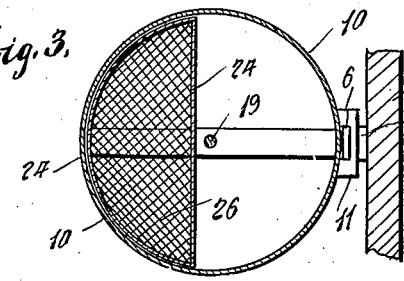
Inventor
W. J. Miller.
Attorney Patented Nov. 5, 1929

1,734,821

UNITED STATES PATENT OFFICE

WARREN J. MILLER, OF ATLANTIC CITY, NEW JERSEY

SALT AND PEPPER DISPENSER

Application filed July 26, 1928. Serial No. 295,526.

The invention relates to a device for holding salt or pepper to be discharged into salt and pepper shakers and has for its object the provision of a device including a hopper for containing the material to be dispensed provided with a tapered bottom to which is securable a tapered spout designed to discharge the salt and pepper in a small stream to directly fill a condiment shaker and provided with a valve for controlling the discharge of material from the hopper having a plunger rod extending through the top of the hopper and an expansible spring engaging the plunger rod to hold the valve normally closed.

A further object of the invention is the provision in a device of the character stated of a filling opening in the top of the hopper and a sieve removably mounted in the hopper alined with the opening to sift the material in filling the hopper to prevent large particles entering the hopper that would endanger operation of the valve.

A further object of the invention is the provision of a salt and pepper shaker including a holder having a base and an upright mounted on the base and provided with means for suspending a hopper on the upright in position to hold and discharge the contents of the hopper, and providing also a tray mounted on the base to catch and hold material discharged from the hopper that may overflow the containers when being filled.

The invention will be described in detail hereinafter and will be found illustrated in the accompanying drawings in which Figure 1 is a front view in elevation of the improved salt and pepper dispenser, Figure 2 is a central vertical sectional view, and Figure 3 is a transverse sectional view on a plane indicated by the line 3—3 of Figure 2.

In the drawings similar reference characters are used to designate corresponding parts throughout the several views.

The improved salt and pepper dispenser includes a supporting member comprising a base 1 on which is mounted an upright 2, 3 indicating angular brace members that connect the base 1 with the upright member 2. Secured to the upright member 2 is a bar 4 made preferably of a flat strip of metal and having its upper end offset as shown at 5 to provide a hook member 6, while its lower end is rebent on itself as shown at 7. Intermediate of the ends of the strip 4 is an angular member 8 having an upwardly extending end 9 that forms another hook that is alined with the hook member 6. The condiment holder comprises a cylindrical member 10 having ears 11 that engage on the hooks 6 and 9. Secured as at 12 to the lower portion of the cylindrical member 10 is a downwardly tapered member 13 forming the bottom of the dispenser hopper, the lower portion of said bottom member 13 being cylindrical and threaded as shown at 14 and adapted to receive a tapered spout 15 that has a cylindrical inwardly threaded member 16 to engage the threaded extremity 14. The lower end of the bottom member 13 has an inwardly extending annular flange 17 that provides a valve seat to coact with a valve plunger 18 to close the entrance to the spout 15.

19 indicates a plunger rod that extends through the top of the hopper designated 20 and has an operating handle 21 secured to its upper end. 22 is an expansible coil spring that terminally engages the handle 21 and the top 20 of the hopper to normally close the valve plunger 18 against the seat. The top 20 is provided with a hinged door 23 through which the material is supplied to the hopper, and 24 designates a screen member that is removably applied to the hopper and held in position therein by means of a hook member 25 that engages over the top edge of the wall of the hopper. The bottom of the screen member 24 is formed of a screen fabric indicated at 26, and the function of the screen 25 is to insure that the material put into the hopper will be finely divided so as to avoid clogging the restricted opening through the bottom of the bottom member 13 and through the restricted opening in the spout 15. It will be apparent that the screen not only prevents lumps of the material itself entering the hopper but will also separate therefrom any foreign matter that may be therein that would tend to interfere with the proper operation of the device. 27 indicates a tray that is adapted to rest on the base 1 and having an ear 28 that engages the rebent portion 7 to hold the tray in position under the spout 15 so that any material that may not be delivered to the condiment holder will be caught in the tray and may be returned to the hopper.

In use it will be apparent that the condiment holder may be filled by holding it under the spout 15 and by depressing the plunger rod 19 to open the valve 18 the material in the hopper will be discharged through the spout 15 to the condiment holder thus making it convenient to fill salt and pepper shakers with the device, and that any material that may be discharged, as heretofore stated and not retained in the condiment holder will fall into the tray 27 and may be returned to the hopper for dispensing.

What is claimed is:—

A granulated product dispenser, comprising a base, a standard supported on said base, a bar secured to said standard and having its upper end offset from the standard forming a hook, the lower end of said bar rebent on itself forming another hook, a hook member secured intermediate the ends of said bar, a hopper having ears slidably engaging the first and last mentioned hooks, dispensing means associated with said hopper, and a tray having an ear engaging the rebent hook and seated on the base aforesaid, said tray being positioned to catch material discharged from the hopper.

In testimony whereof I affix my signature.

WARREN J. MILLER.